(12) United States Patent
Balsells et al.

(10) Patent No.: US 10,184,564 B2
(45) Date of Patent: Jan. 22, 2019

(54) SEAL ASSEMBLIES AND RELATED METHODS

(71) Applicant: Bal Seal Engineering, Inc., Foothill Ranch, CA (US)

(72) Inventors: Peter J. Balsells, Foothill Ranch, CA (US); Hamid Rastegar, Foothill Ranch, CA (US)

(73) Assignee: Bal Seal Engineering, Inc., Foothill Ranch, CA (US)

(*) Notice: Subject to any disclaimer, the term of this patent is extended or adjusted under 35 U.S.C. 154(b) by 138 days.

(21) Appl. No.: 15/011,207

(22) Filed: Jan. 29, 2016

(65) Prior Publication Data

US 2016/0223086 A1  Aug. 4, 2016

Related U.S. Application Data

(60) Provisional application No. 62/110,725, filed on Feb. 2, 2015.

(51) Int. Cl.
| | | |
|---|---|---|
| *F16J 15/32* | (2016.01) | |
| *F16J 15/3208* | (2016.01) | |
| *F16J 15/3212* | (2016.01) | |
| *F16J 15/3268* | (2016.01) | |
| *F16J 15/3276* | (2016.01) | |

(52) U.S. Cl.
CPC ....... *F16J 15/3208* (2013.01); *F16J 15/3212* (2013.01); *F16J 15/3268* (2013.01); *F16J 15/3276* (2013.01)

(58) Field of Classification Search
CPC .... F16J 15/166; F16J 15/3204; F16J 15/3208; F16J 15/3212; F16J 15/322; F16J 15/3236; F16J 15/3248; F16J 15/3268; F16J 15/3276; F16J 15/56

See application file for complete search history.

(56) References Cited

U.S. PATENT DOCUMENTS

| | | | | | |
|---|---|---|---|---|---|
| 4,890,937 | A | * | 1/1990 | Balsells | ............ F16C 27/02 277/589 |
| 5,474,309 | A | * | 12/1995 | Balsells | ............ H05K 9/0016 174/351 |
| 5,599,027 | A | * | 2/1997 | Balsells | ............ H05K 9/0016 174/367 |
| 6,161,838 | A | * | 12/2000 | Balsells | ............ F16J 15/3216 277/511 |
| 7,210,398 | B2 | * | 5/2007 | Balsells | ............ F16J 1/008 277/437 |

(Continued)

OTHER PUBLICATIONS

Examination Report on corresponding foreign application (DE Application No. 10 2016 101 795.7) from the German Patent Office dated Nov. 23, 2017.

*Primary Examiner* — Nicholas L Foster
(74) *Attorney, Agent, or Firm* — Klein, O'Neill & Singh, LLP (57) ABSTRACT

Spring energized seal assemblies configured for use in static or dynamic application and methods of using and making same are provided. The seal assemblies can each have a sealing component and optionally a backup ring or a locking ring or both. An annular spring can be used with a spring groove of either the backup ring or the locking to facilitate assembling of the mentioned components of a seal assembly onto each other and the entire seal assembly into a seal cavity of a housing.

23 Claims, 4 Drawing Sheets

(56) References Cited

U.S. PATENT DOCUMENTS

| | | | | |
|---|---|---|---|---|
| 8,544,850 B2* | 10/2013 | Balsells | ............... | F16J 15/166 |
| | | | | 277/511 |
| 8,684,362 B2* | 4/2014 | Balsells | ............... | F16J 15/3212 |
| | | | | 277/353 |
| 9,194,497 B2* | 11/2015 | Rastegar | ............. | F16J 15/3212 |
| 9,234,591 B2* | 1/2016 | Dilmaghanian | ..... | F16J 15/3208 |
| 9,285,034 B2* | 3/2016 | Balsells | ............... | F16J 15/3212 |
| 2002/0153664 A1* | 10/2002 | Schroeder | ............. | F16J 15/002 |
| | | | | 277/551 |
| 2005/0212218 A1* | 9/2005 | Balsells | ................. | F16J 1/008 |
| | | | | 277/434 |
| 2009/0146379 A1* | 6/2009 | Foster | ................ | F16J 15/3212 |
| | | | | 277/307 |
| 2010/0237566 A1* | 9/2010 | Balsells | ............... | F16J 15/166 |
| | | | | 277/550 |
| 2011/0037234 A1* | 2/2011 | Balsells | ............... | F16J 15/3212 |
| | | | | 277/562 |
| 2013/0043661 A1* | 2/2013 | Binder | ................. | F16J 15/322 |
| | | | | 277/554 |
| 2014/0265139 A1* | 9/2014 | Dilmaghanian | ..... | F16J 15/3208 |
| | | | | 277/309 |
| 2015/0061227 A1* | 3/2015 | Rastegar | ............. | F16J 15/3212 |
| | | | | 277/309 |
| 2017/0172018 A1* | 6/2017 | Dilmaghanian | ..... | H05K 9/0016 |

* cited by examiner

SEAL ASSEMBLIES AND RELATED METHODS

FIELD OF ART

The present disclosure generally relates to seal assemblies and more particularly to seal assemblies having engagement mechanisms that facilitate installation for static and/or dynamic applications.

BACKGROUND

Typically, a seal assembly used in a static application or a dynamic application, such as with a rotary or a reciprocating shaft within a housing, is engaged to a seal cavity of the housing by various engagement methods, such as press-fitting, snap-fitting, threading, etc. An complication may arise when such a seal assembly is fitted in the seal cavity and the assembly has components with material properties required to operate within the intended conditions that may otherwise be stiff, rigid, and/or hard. For example, a cantilever feature press-fit may, in some cases, be too rigid and require a high installation force. The components of the seal assembly may comprise a sealing component, a backup ring, and a locking ring and wherein the sealing component is typically made of a fluoropolymer-based material, such as PTFE or PTFE base material, while the backup ring and the locking ring may be made of materials that are greater in hardness than that of the sealing component, such as metals or hard engineered plastics.

A high installation force is typically necessary to install a seal assembly in a seal cavity of the housing when said assembly has components, such as a backup ring and a locking ring, that are made of relatively hard or stiff materials. Also due to the high installation force, the seal assembly may not be centered correctly within the spring cavity of the housing, and thus such misalignment may lead to uneven wear of the sealing components, failure in retaining the seal assembly within the housing, and premature failure, most notably when the seal assembly is used for dynamic applications.

SUMMARY

Seal assemblies described herein include a spring groove as part of the locking ring, the backup ring, or both for engaging a housing or another surface. An annular spring is positioned within each spring groove for engaging the housing or another surface. The annular spring, which may be a canted coil spring, reduces the high installation force and improves alignment of the seal assembly within the seal cavity of the housing compared to assemblies that use a cantilever, also refers to as a leaf spring, or other conventional engagement means, such as press-fit. The reduction of the high installation force occurs because of the more deflective capability of the annular spring as compared to that of the conventional engagement means. In addition, the configuration of the spring grooves also may facilitate insertion by providing tapered surfaces that cause the annular springs to rotate within the spring grooves, resulting in reduced installation force when compared to removal force. Also, such reduction of installation force may eliminate misalignment of the seal assembly within the seal cavity of the housing as the force to retain the seal assembly can be more evenly spread out on the annular spring.

Such facilitation of assembly further comprises a groove within the housing wherein the annular spring or an extended flange of the sealing component may be used to better retain the seal assembly within the housing. Such retaining method may comprise a latching or a locking mechanism that represents a snap-fit.

Furthermore, facilitation of assembly among components of the seal assembly, wherein the assembly may be between the sealing component and the backup ring or the sealing component and the locking ring, may be achieved by having another annular spring within a spring groove in one of the components and another groove for engagement in the component that must be assembled. Similar to how the seal assembly discussed engages with the housing, the components of the seal assembly may engage by another annular spring within a spring groove engaging with another groove of the component that is to be assembled. Such engagement means may comprise a latching or a locking mechanism that represents a snap-fit.

More advantages and the specifics of configuration are discussed in the detailed description of the drawings.

Another aspect of the present disclosure is a seal assembly suitable for at least one of static, rotary, and reciprocating sealing applications between a shaft and a housing. The seal assembly can comprise: a sealing component and a locking ring; wherein the sealing component has a seal lip for sealing engagement with the shaft; wherein the locking ring is engaged to the sealing component and together with the sealing component defining a spring cavity; wherein a first annular spring is positioned within said spring cavity to energize the seal lip of the sealing component; wherein the locking ring comprises at least one spring groove; wherein a second annular spring is positioned within the at least one spring groove; and wherein the second annular spring engages the housing.

The locking ring can be without a cantilever.

The second annular spring can engage the housing to retain the seal assembly within the housing.

The second annular spring can engage the housing to facilitate assembly of the seal assembly into the housing.

The first annular spring can be a canted coil spring.

The second annular spring can be a canted coil spring.

The housing can further comprise a groove and wherein the groove in the housing can receive part of the second annular spring.

The second annular spring can be filled with an elastomer.

The at least one spring groove in the locking ring can have a tapered bottom located between two sidewalls.

Yet another aspect of the present disclosure is a seal assembly suitable for at least one of static, rotary, and reciprocating sealing applications between a shaft and a housing and wherein said seal assembly can comprise: a sealing component, a backup ring, and a locking ring; wherein the sealing component has a seal lip for sealing engagement with the shaft; wherein the sealing component is engaged to the backup ring; wherein the locking ring is engaged to the sealing component and together with the sealing component defining a spring cavity; wherein a first annular spring is positioned within said spring cavity to energize the seal lip of the sealing component; wherein the backup ring comprises an at least one spring groove; wherein a second annular spring is positioned within the at least one spring groove of the backup ring; and wherein the second annular spring engages the housing.

The housing can further comprise a mating groove and wherein the mating groove can receive at least part of the second annular spring.

The locking ring can have a spring groove having a canted coil spring located therein and biasing against the housing.

The at least one spring groove can have a tapered bottom located between two sidewalls.

A further feature of the present seal assembly can comprise: a sealing component comprising a spring cavity; wherein the sealing component has a seal lip for sealing engagement with the shaft; wherein the sealing component comprises an extended flange that engages with a groove in the housing for retention of the seal assembly within the housing; and wherein a first annular spring is within said spring cavity to energize the seal lip of the sealing component.

The seal assembly wherein the extended flange of the sealing component can engage the groove in the housing for retention of the seal assembly within the housing by a snap-fit engagement.

The seal assembly can be a piston-mounted seal.

The seal assembly can be a housing-mounted seal.

A seal assembly suitable for at least one of static, rotary, and reciprocating sealing applications between a shaft and a housing can also comprise: a sealing component comprising a spring cavity and a backup ring; wherein the sealing component has a seal lip for sealing engagement with the shaft; wherein the sealing component comprises an at least one first groove; wherein a first annular spring is within said spring cavity to energize the seal lip of the sealing component; wherein the backup ring comprises an at least one second groove; wherein at least one second annular spring is within the at least one of said first or second groove; and wherein the sealing component and the backup ring are engaged by the at least one second annular spring fit within the at least one said first or second groove of the sealing component or the backup ring engaging with the other at least one said first or second groove of the sealing component or the backup ring.

The at least one second annular spring can be a canted coil spring.

The seal assembly can be a face seal.

The engagement of the sealing component and the backup ring can be a snap-fit engagement.

The engagement of the sealing component and the backup ring can be a latch or a lock engagement.

The at least one first groove can be a tapered-bottom groove.

The at least one second groove can be a tapered-bottom groove.

A still further feature of the present disclosure is a seal assembly suitable for at least one of static, rotary, and reciprocating sealing applications between a shaft and a housing and wherein said seal assembly can comprise: a sealing component comprising a spring cavity and a backup ring; wherein the sealing component has a seal lip for sealing engagement with the shaft; wherein the sealing component or the backup ring comprises an at least one spring groove; wherein a first annular spring is within said spring cavity to energize the seal lip of the sealing component; wherein at least one second annular spring is within the at least one spring groove; and wherein the sealing component and the backup ring are engaged by the at least one second annular spring providing a load to accomplish a press-fit engagement.

A yet further feature of the present disclosure is a seal assembly suitable for at least one of static, rotary, and reciprocating sealing applications comprising: a sealing component and a locking ring; wherein the sealing component has a seal lip for sealing a surface of a shaft; wherein the locking ring is engaged to the sealing component and together with the sealing component defining a spring cavity; wherein a first annular spring is positioned within said spring cavity to energize the seal lip of the sealing component; wherein the locking ring comprises at least one spring groove; wherein a second annular spring is positioned within the at least one spring groove; and wherein the second annular spring is configured to bias against a housing.

The locking ring of the seal assembly suitable for at least one of static, rotary, and reciprocating sealing applications can be without a cantilever.

The second annular spring can engage a housing to retain the seal assembly within the housing.

The at least one spring groove on the locking ring can comprise a bottom wall located between two sidewalls.

The first annular spring of the seal assembly suitable for at least one of static, rotary, and reciprocating sealing applications can be a canted coil spring.

The second annular spring can be a canted coil spring.

A housing used with of the seal assembly suitable for at least one of static, rotary, and reciprocating sealing applications can further comprise a spring groove and wherein the spring groove of the housing can receive part of the second annular spring.

The second annular spring can be filled with an elastomer.

The bottom wall can be tapered relative to the two sidewalls or can comprise a V-shaped surface.

A further aspect of the present disclosure is a seal assembly suitable for at least one of static, rotary, and reciprocating sealing applications comprising: a sealing component, a backup ring, and a locking ring; wherein the sealing component has a seal lip for sealing a surface of a shaft; wherein the sealing component is engaged to the backup ring; wherein the locking ring is engaged to the sealing component and together with the sealing component defining a spring cavity; wherein a first annular spring is positioned within said spring cavity to energize the seal lip of the sealing component; wherein the backup ring comprises an at least one spring groove; wherein a second annular spring is positioned within the at least one spring groove of the backup ring; and wherein the second annular spring is configured to engage a housing.

The second annular spring can be a canted coil spring.

The first annular spring can be a V-spring or a ribbon spring.

The locking ring can be without a cantilever for radially biasing against a bore of a housing.

The seal assembly can be installed with a housing and the housing can further comprise a mating spring groove and wherein the mating spring groove receives at least part of the second annular spring.

The locking ring can include a spring groove having a canted coil spring located therein and biasing against a housing.

The at least one spring groove of the backup ring can have a tapered bottom located between two sidewalls.

Still yet another aspect of the present disclosure includes a seal assembly suitable for at least one of static, rotary, and reciprocating sealing applications comprising: a sealing component comprising an inside flange, an outside flange, and a center channel section defining a spring cavity; wherein the sealing component has a seal lip sealing a surface of a shaft; wherein the sealing component comprises a flange projection that projects into and engages a groove in a housing for retaining the seal assembly within the housing; and wherein a first annular spring is positioned in said spring cavity to energize the seal lip of the sealing component against the shaft.

The flange projection of the sealing component can engage the groove in the housing for retaining the seal assembly within the housing by a snap-fit engagement.

The seal assembly can be piston-mounted.

The seal assembly can be housing-mounted.

Yet another aspect of the present disclosure is a seal assembly suitable for at least one of static, rotary, and reciprocating sealing applications comprising: a sealing component and a backup ring; said sealing component comprising an inside flange, an outside flange, and a center channel section defining a spring cavity; wherein the sealing component has a seal lip for sealing a surface of a shaft; wherein the sealing component comprises a spring groove; wherein a first annular spring is positioned in said spring cavity to energize the seal lip of the sealing component; wherein the backup ring comprises a spring groove; and wherein a second annular spring is positioned in said spring groove of said sealing component and said spring groove of said backup ring to engage said backup ring with said sealing component.

The backing ring can comprise a second spring groove having a third annular spring located therein.

The sealing component can have a projection and the backup ring can have a recess and wherein the projection can fit within the recess in a mechanical inter-engagement.

The engagement of the sealing component and the backup ring can be a snap-fit engagement.

The engagement of the sealing component and the backup ring can be a latch or a lock.

The spring groove of the sealing component can have a tapered-bottom groove.

The spring groove of the backup ring can have a tapered-bottom groove.

When a seal assembly has more than one spring groove, whether in a sealing component, a backup ring, a locking ring, or combinations thereof, the spring grooves may be referred to as a first spring groove, a second spring groove, etc. to distinguish one spring groove from another spring groove by name or reference only. Unless the context indicates otherwise, the distinction is not structurally limiting.

When a seal assembly has more than one annular spring, whether in a sealing component, a backup ring, a locking ring, or combinations thereof, the annular springs may be referred to as a first annular spring, a second annular spring, etc. to distinguish one annular spring from another annular spring by name or reference only. Unless the context indicates otherwise, the distinction is not structurally limiting.

The annular spring in the spring cavity of the sealing component can contact and bias outwardly against the outside flange and the inside flange of the sealing component. If a locking ring is used, the annular spring can bias against the locking ring to bias against either the inside flange or the outside flange that is in contact with the locking ring. For example, wherein the locking ring can be made from a first material and the second annular spring can be made from a second material, which is different from the first material.

Various spring properties can be selected for the annular spring used with the locking ring. The various properties can be selected to control the spring force against a bore of a housing. For example, coil spacing, front angle selection, back angle selection, point of contact near the major axis of the spring, point of contact near the minor axis of the spring, and coil height to width ratio can be selected to control the biasing force against the bore of the housing, which do not depend on the material selection of the locking ring.

The annular spring of the locking ring can be a canted coil spring and wherein a major axis of the canted coil spring can be angled relative to a lengthwise axis of the seal assembly so that insertion of the seal assembly into a bore of a housing requires less force than removing the seal assembly from the bore of the housing.

The spring cavity having an annular spring for biasing a sealing lip of the sealing component can be defined by just an inside flange, an outside flange, and a center channel section of the sealing component, or can be formed in part with a locking ring. Thus, the annular spring located inside the spring cavity can bias against the inside flange and the outside flange or against the locking ring and just one of the flanges of the sealing component.

The spring grooves used herein can have a bottom surface or wall located between two sidewalls and wherein the bottom wall can be adjusted or selected, such as machined or formed to a particular angle, from steep to flat and anywhere in between to control the sitting position of the annular spring inside the spring groove. The two sidewalls can be parallel to one another or can be angled relative to one another. The bottom wall can alternatively have a V-shaped structure.

The direction or orientation of the tapered bottom of the spring groove can act to rotate the position of the annular spring located therein so that when the annular spring is slid in one direction, such as during insertion, the force required is lower force than when sliding the spring in the opposition direction. The annular spring can be a canted coil spring, such as a radial canted coil spring or an axial canted coil spring.

Engagement between a spring groove of a sealing component and a spring groove of a backing ring and an annular spring therebetween can limit radial movement of the sealing component relative to the backing ring and relative to the lengthwise axis of the seal assembly through the bore of the seal assembly. The engagement of the components of the seal assembly to each other, or to the seal cavity in the housing, using annular springs may facilitate assembly of the seal assembly into a seal cavity of the housing when the housing is in a hard to reach location or in an awkward position.

The contact point of the canted coil spring against the housing can be further away from the major axis of the annular spring during insertion to install the seal assembly into the seal cavity than during removable, which can be further away from the major axis to require less force.

When a locking ring having a spring groove is used with a sealing component, the annular spring located in the spring groove can bias against the spring groove and a flat surface of a housing or a spring groove formed with the housing. If a spring groove is used with the housing, the engagement with the annular spring with the locking ring can be a latching engagement or a locking engagement.

Any of the annular springs described herein can be used with or without an elastomer and the elastomer can have a hollow core or be solid.

Advantages of using annular springs within spring grooves, in addition to using an annular spring in a spring cavity defined by a sealing component, include reduced installation force and can improve the centering of the seal assembly within the seal cavity of the housing with respect to a centerline. The improved centering of the seal assembly may allow the seal to wear more evenly, and thus, provide better overall sealing.

A method of manufacturing a seal assembly of any one of the foregoing.

A method of using a sealing assembly of any one of the foregoing.

A still further feature of the present disclosure is a method of manufacturing a seal assembly suitable for at least one of static, rotary, and reciprocating sealing applications comprising: forming a sealing component comprising an inside flange, an outside flange, and a center channel section defining a spring cavity; assembling a backup ring with the sealing component; placing a first annular spring within said spring cavity to bias against the inside flange and the outside flange and a seal lip of the sealing component; placing a second annular spring into a spring groove of the backup ring; and placing the second annular spring into a spring groove of the sealing component or a spring groove of a housing.

The method wherein the backup ring further comprises a second spring groove having a third annular spring located therein.

DESCRIPTION OF DRAWINGS

These and other features and advantages of the present devices, systems, and methods will become appreciated as the same become better understood with reference to the specification, claims and appended drawings wherein:

DETAILED DESCRIPTION

The detailed description set forth below in connection with the appended drawings is intended as a description of the presently preferred embodiments of seal assemblies provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
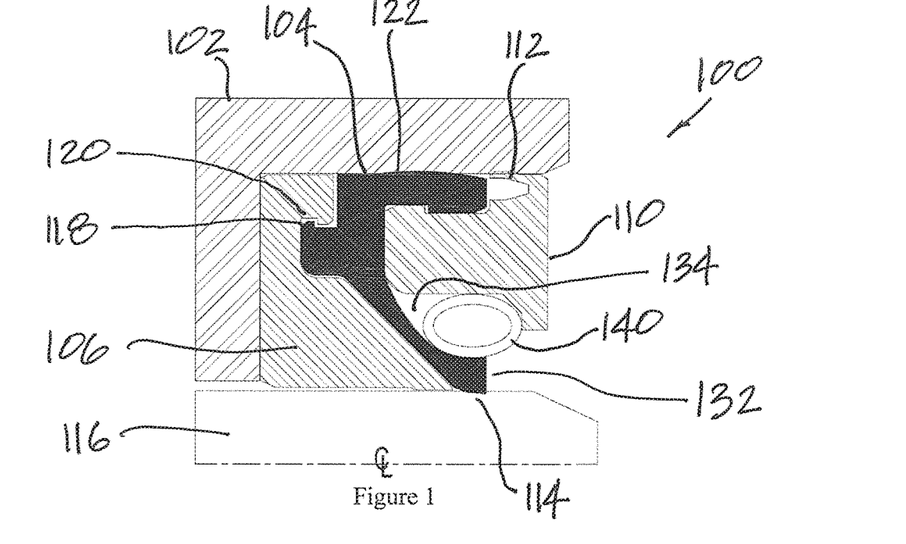
FIG. 1 shows a seal assembly positioned within a spring cavity of a housing that comprises a sealing component, a backup ring, and a locking ring.

FIG. 1 shows a seal assembly 100, such as a cartridge seal assembly, comprising housing 102, a sealing component 104, a backup ring 106, and a locking ring 110, wherein the locking ring 110 has a cantilever 112 that is used to press-fit into a seal cavity of the housing 102. That is, the cantilever 112 is biased or flexed to fit within the bore of the housing 102 and applies a biasing force against the interior bore surface. The sealing component 104 has a seal lip 114 for sealing a shaft 116, such as for sealing a surface of the shaft. The sealing component 104 has a protrusion 118 that engages a recess 120 formed with the backup ring 106 to form a mechanical inter-engagement, in which the engagement is a snap-fit type. In certain applications and industries, the shaft 116 may alternatively be referred to as a piston. Similar snap-fit type engagement mechanism is shown for the locking ring 110 and the sealing component 104, at the inside surface of the outside flange 122 of the sealing component 104, which forms another mechanical inter-engagement. Seal assemblies disclosed herein are understood to be annular in configuration and each having a bore with only part of each seal assembly cross-section shown for discussion purposes.

Figure 5:
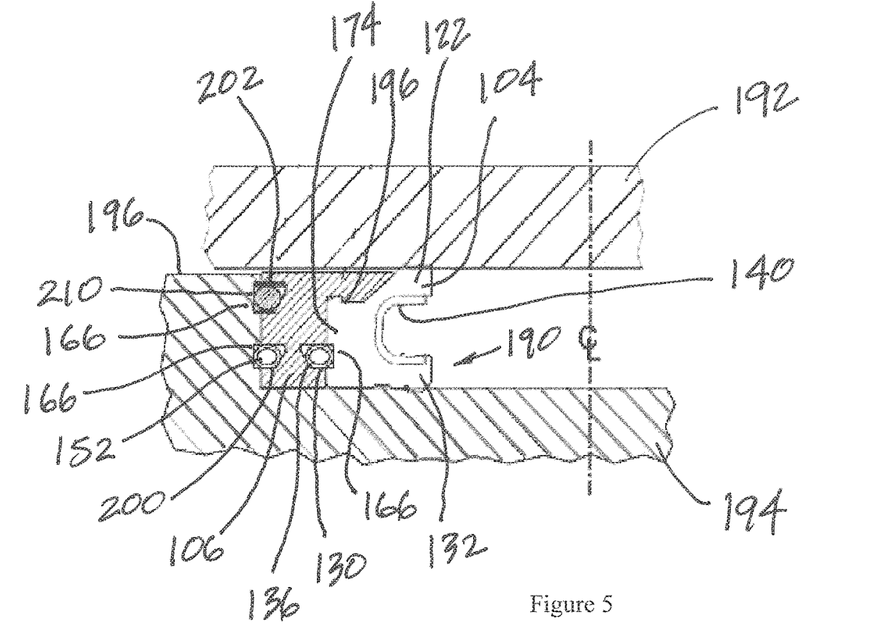
FIG. 5 shows a seal assembly wherein the sealing component is engaged with the backup ring by an annular spring within a spring groove and the entire seal assembly engaged in the direction of a centerline with a spring cavity of a housing by another annular spring within another spring groove.

In assembling such components together to form the seal assembly 100, engagement means, such as the mechanical inter-engagements discussed immediately above, are not limited to snap-fit type but may also comprise other fitting types, such as press-fit and threaded connection. For example, an alternate engagement is shown in FIG. 5 where an annular spring 130 is used instead of protrusions between the backup ring 106 and the sealing component 104 of the seal assembly to achieve engagement. With reference again to FIG. 1, after assembly the engagement between the locking ring 110 and the outside flange 122 of the sealing component 104, along with the inside flange 132, forms a spring cavity 134 wherein a first annular or garter spring 140, which can be an annular canted coil spring, is positioned and energizes the seal lip 114 of the sealing component 104, which is understood to urge or bias the seal lip against a surface to be sealed. The first annular spring 140 is not limited to a canted coil spring and may comprise other types of annular springs, such as a V-spring 140 shown in FIG. 5 or a ribbon spring. The first annular spring 140 of the present disclosure should contact and bias against both the inside flange and the outside flange of the sealing component 104, or to the locking ring 110 if one is used with the outside flange to define a spring cavity 134. Where a locking ring is used, the first annular spring 140 is understood to bias both the inside flange and the outside flange and wherein the biasing of the outside flange can be via biasing the locking ring, which is in contact with the outside flange.

Figure 2:
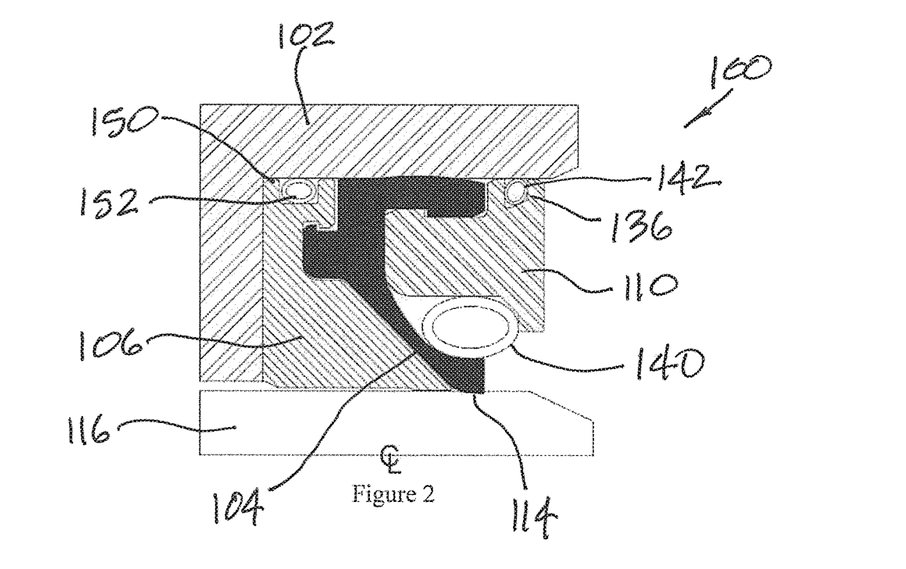
FIG. 2 shows a seal assembly in accordance with aspects of the present disclosure fit within a spring cavity of a housing by two annular springs within two spring grooves located at a locking ring and a backup ring.

FIG. 2 shows another seal assembly 100 comprising similar components as that of FIG. 1, including a housing 102, a sealing component 104, a backup ring 106, a locking ring 110, and a first annular spring 140. In the present seal assembly embodiment, the locking ring 110 has a spring groove 136, shown with a tapered-bottom located between two sidewalls, with a second annular spring 142, shown as a canted coil spring. The second annular spring 142 is used to engage the seal assembly with the housing 102 to position the seal assembly 100 inside the seal cavity, which is the space defined by the housing 102 and the shaft 116 for accommodating the seal assembly. Whereas the locking ring 110 of FIG. 1 uses a cantilever feature on the locking ring to engage the housing 102, which heavily depends on the material property of the locking ring to configure the biasing force of the cantilever against the housing, the present embodiment replaces the cantilever feature with the second annular spring 142, which can be made from a different material than the material used to make the locking ring 110. Thus, the biasing force against the housing to assemble the seal assembly within the seal cavity is less dependent on the material of the locking ring 110. Further, various spring properties can be selected for the second annular spring 142, which can be a canted coil spring, to control the spring force against the bore of the housing 102. For example, coil spacing, front angle selection, back angle selection, point of contact near the major axis of the spring, point of contact near the minor axis of the spring, and coil height to width ratio can be selected to control the biasing force against the bore of the housing, which do not depend on the material selection of the locking ring.

The tapered bottom groove configuration of the spring groove 136 can also be configured to provide a relatively high force for removal of the seal assembly compared to when spring seal assembly is inserted into the seal cavity to prevent the seal assembly from inadvertently disengaging from the seal cavity. For example, the taper angle can be adjusted from steep to flat and anywhere in between to control the sitting position of the spring 142 inside the spring groove 136. As shown, the direction or orientation of the tapered bottom of the spring groove rotates the position of the second spring 142 within the spring groove 136 so that when the spring 142 is slid in one direction, such as during insertion, the force required is lower force than when sliding the spring in the opposition direction. More particularly, as oriented, the contact point of the spring against the housing is further away from the major axis of the spring during insertion to install the seal assembly into the seal cavity than during removable, which is at or is closer to the major axis. Such use of a canted coil spring 142 within the tapered bottom groove 136 facilitates assembly by reducing the installation force of the seal assembly 100 into the seal cavity of the housing 102 and better aligning the seal assembly 100 so that the surface of the seal lip 114 of the sealing component can be equally worn. However, removal of the locking ring 110 in the opposition direction to the installation direction will create a contact point that is at or closer to the major axis, as previously discussed, to make removable more difficult than installation of the locking ring 110. The number of spring groove and annular springs is not limited to just one spring groove and one annular spring as depicted and can include multiple spring grooves and annular springs on different surfaces of the locking ring 110.

FIG. 2 also shows the backup ring 106 having a second spring groove 150, shown as a flat-bottom groove located between two sidewalls, with a third annular spring 152, shown as a canted coil spring. The configuration of the second spring groove 150 is not limited to a flat-bottom groove and can comprise other configurations, such as a tapered bottom, tapered sidewalls, etc. The third canted coil spring 152 within the second spring groove 150 of the backup ring 106 functions similarly to that of the second canted coil spring 142 within the first spring groove 136 of the locking ring 110. In the present embodiment, the third canted coil spring 152 facilitates assembly by helping to reduce the installation force and improving alignment of the seal assembly within the seal cavity of the housing. As shown, the installation is assisted by orientating the third canted coil spring 152 so that the force generated by the third spring 152 against the bore of the housing 102 is closer to or at the minor axis of the spring, which deflects the plurality of coils compared to when the force is closer to the major axis of the spring. Thus, as shown, the seal assembly 100 will slide into the bore of the housing 102 during installation with the third canted coil spring 152 in contact with the bore during the majority of the sliding motion, which can be viewed as moving from right to left of FIG. 2 into the bore, and with the second canted coil spring 142, which has a higher contact force than the third canted coil spring 152 due to its slanted position, only contacting the bore a much shorter distance or amount after entry into the opening of the bore. The number of spring groove and annular spring in the back up ring 106 is not limited to solely one spring groove and one annular spring as is depicted and can include more than one and on or at more than one surface of the backup ring. The second annular spring 142 of the locking ring 110 and the third annular spring 152 of the backup ring 106 may be used simultaneously as depicted in FIG. 2, or it may be used separately. In other words, in one example, the seal assembly 100 does not incorporate the first spring groove 136 and second canted coil spring 142. In another example, the seal assembly 100 does not incorporate the second spring groove 150 and third canted coil spring 152. Not only do the second and third annular springs 142, 152 facilitate assembly of the seal assembly into the housing 102, they may also strengthen retaining capabilities of the seal assembly 100 within the seal cavity of the housing 102.

Figure 3A:
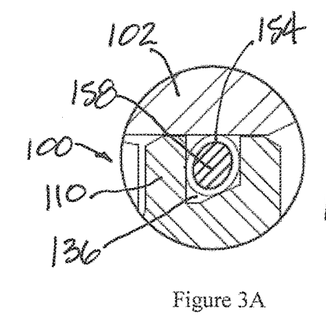
FIG. 3A-G shows different configurations of spring grooves of a locking ring of a seal assembly and of a housing of a seal cavity to achieve engagement between the two.

Advantages of using annular springs within spring grooves include reduced installation force and improves the centering of the seal assembly within the seal cavity of the housing with respect to a centerline. The improved centering of the seal assembly may wear out the sealing component more evenly, and thus, provide better overall sealing. FIGS. 3A-G show alternative embodiments for implementing the first spring groove 136 and for using different spring types positioned within the first spring groove 136 of the locking ring 110. FIG. 3A shows an elastomer filled annular spring 154 filled with an elastomer 158 within a tapered-bottom groove 136 between two sidewalls to hold the seal assembly 100 within the seal cavity of the housing 102. The two sidewalls can be generally parallel to one another as shown or can tapered relative to one another. The tapered-bottom groove configuration allows the elastomer filled annular spring 154 to rotate within the spring groove 136 in a direction that facilitates the insertion of the seal assembly 100 into the seal cavity of the housing, but does not allow the second annular spring 154 to rotate in the opposite direction, which results in good retention of the seal assembly within the housing and a higher force for removal of from the housing, which can reduce misalignment during service.

Figure 3B:
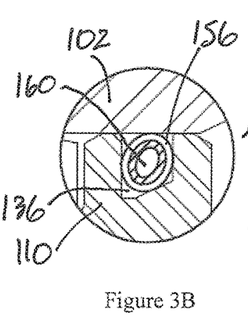

FIG. 3B shows the same spring groove configuration 136 as that shown in FIG. 3A but with a different second annular spring 156, which is filled with an elastomer 158 with a hollow center 160. The hollow center 160 of the elastomer filled annular spring 156 may allow more deflection of the spring than the elastomer filled annular spring 154 without the hollow center as shown in FIG. 3A, but provides more force than a completely hollow annular spring.

Figure 3C:
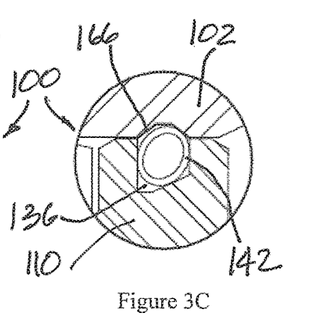

FIG. 3C shows the same spring groove 136 configuration as those of FIG. 3A and FIG. 3B for retaining a canted coil spring 142. In the present embodiment, an extra groove 166 within the seal cavity of the housing 102, such as a housing groove 166, is provided to retain the seal assembly 100 within the seal cavity. The extra groove 166 may be referred to as a mating groove for receiving part of the canted coil spring that extends outside of the spring groove 136. The seal assembly 100 of FIG. 3C is retained within the housing 102 by allowing a portion of the second annular spring 142 within the spring groove 136 to also be located within the housing groove 166 within the seal cavity upon assembly, resembling a latching or a locking mechanism. That is, the seal assembly 100 can comprise a spring groove 135 with a spring 142 in the locking ring 110 and wherein the seal assembly either latches to the housing 102 or locks to the housing 102 by allowing the spring 142 in the locking ring 110 to also engage a spring groove 166 in the housing 102. When latching is provided, the seal assembly 100 can separate from the housing 102 without destroying the spring 142. When locking is provided, the seal assembly cannot separate from the housing 102 without destroying the spring. As shown, the housing groove 166 has two tapered surfaces and a flat bottom surface located therebetween. In other examples, the housing groove 166 has two tapered surfaces that contact one another at an apex. In still other examples, the housing groove 166 can embody other shapes, such as two sidewalls with a tapered bottom surface.

Figure 3D:
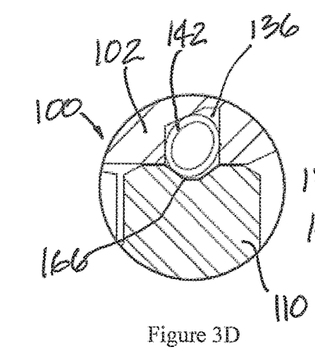

FIG. 3D shows a similar concept as that shown in FIG. 3C but the two grooves 136, 166 are reversed. In the present embodiment, the canted coil spring 142 is housing mounted as the spring groove 136 with the tapered bottom is located in the housing 102. The additional groove 166 is now provided with the locking ring 110. The additional groove 166 has two tapered surfaces with a flat-bottom located therebetween. Any attempt to remove the seal assembly 100 will force the canted coil spring 142 to bias along at or near its major axis against one of the tapered surfaces on the additional groove 166 of the locking ring 110, which is more of a locking mechanism and can prevent disassembly altogether.

Figure 3E:
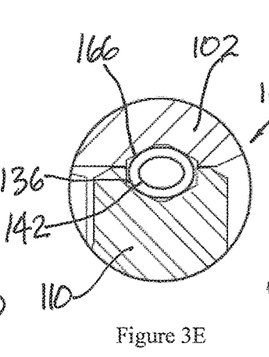
Figure 3F:
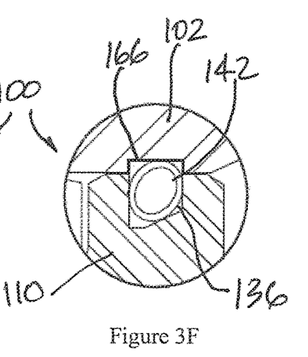
Figure 3G:
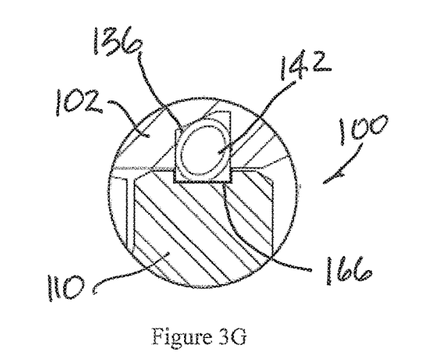

FIG. 3G shows the same concept as that of FIG. 3D but with the additional groove 166 on the locking ring 110 having two generally parallel sidewalls with a flat bottom wall located therebetween. Thus, the present embodiment shows that the additional groove 166 for receiving the part of the spring 142 that extends out of the spring groove 136 can embody different shapes. Any attempt to remove the seal assembly 100 will force the canted coil spring 142 to bias along at or near its major axis against one of the tapered surfaces on the groove 166 on the locking ring 110, which is more of a locking mechanism and can prevent disassembly altogether.

FIG. 3E shows a V-bottom groove as the spring groove 136 on the locking ring 110 for holding the canted coil spring 142 and the additional groove 166 in the housing 102 for receiving the extended part of the canted coil spring. The additional groove 166 may have the same groove configuration as the spring groove 136 or a different groove configuration, such as including a bottom surface between two tapered surfaces. Such configuration shown in FIG. 3E may achieve a latching mechanism in that the biasing force during removal is at or closer to the minor axis than the major axis, which permits canting to allow the spring to separate from the housing groove.

FIG. 3F shows an arrangement that is similar to that of FIG. 3C except the housing groove 166 has a groove configuration with two generally parallel sidewalls and a flat bottom wall located therebetween. Any attempt to remove the seal assembly 100 will force the canted coil spring 142 to bias along at or near its major axis against the housing groove 166, which is more of a locking mechanism and can prevent disassembly altogether.

Figure 4A:
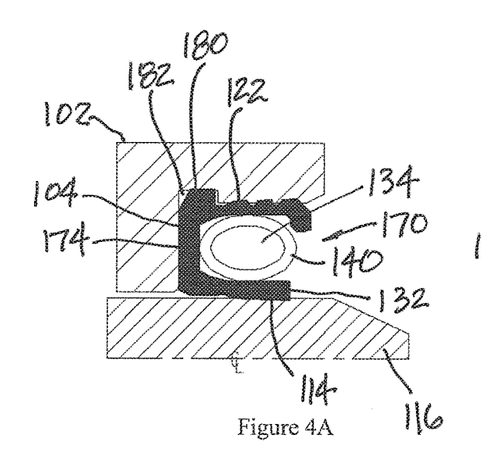
FIG. 4A-B shows a seal assembly with an extended flange engaged with a spring cavity in both housing mounted and piston mounted configurations.
Figure 4B:
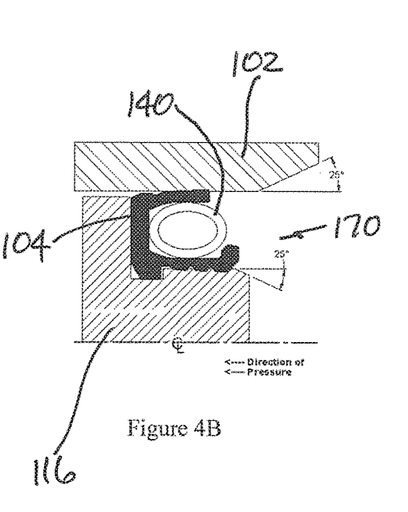

FIGS. 4A and 4B show two different alternate methods for installing a seal assembly 170 within a seal cavity of a housing 102. Different from FIG. 2, FIGS. 4A and 4B show just the sealing component 104 without a backing ring and without a locking ring. The sealing component 104 has an inside flange 132, and outside flange 122, and a center channel section 174 connecting the inside and outside flanges. A first canted coil spring 140 is located in a spring groove 140 formed by the inside and outside flanges and the center channel section. Such reduction of components simplifies the assembly process with fewer sealing components compared to other seal assemblies discussed elsewhere herein.

With specific reference to the seal assembly 170 of FIG. 4A, the outside flange 122 is provided as an extended flange wherein a flange projection 180 on the extended flange is used to engage the sealing component 104 with a groove 182 formed with the housing 102, which can be an annular groove 182. Similar to the sealing component in the seal assembly of FIG. 2, the sealing component of FIG. 4A has a seal lip 114 that engages the shaft 116, such as pressed against to form a seal with the shaft. Such method of assembly dramatically simplifies the assembly process and may also securely retain the sealing component 104 within the seal cavity. FIG. 4A shows the seal assembly 170 being housing-mounted. That is, the seal assembly is mounted to and is stationary relative to the housing 102. The seal assembly 170 of FIG. 4B is similar to that of FIG. 4A but wherein the seal assembly is piston-mounted in FIG. 4B. That is, the seal assembly 170 is mounted to and is stationary relative to the piston 116.

FIG. 5 shows a seal assembly 190 that is a face seal comprising a sealing component 104 and a backup ring 106. The seal assembly 190 is configured to be positioned between two stationary components 192, 194 to seal a flow path or gap 190 between the two. For example, the first stationary component 192 can be a head cover for sealing against a housing 194, which can be the second stationary component. In the present embodiment, the sealing component 104 has an outer flange 122, an inside flange 132, and a center channel section 174 that together define a spring cavity for retaining a first annular spring 140. The outer flange 122 and the inside flange 132 may alternatively be called a first flange and a second flange, respectively. The first annular spring 140 biases against both the outer flange 122 and the inside flange 132 to maintain a biasing force at both flanges against the respective mating surfaces of the two stationary components 192, 194.

As shown, the first annular spring 140 to be used as the energizer for the two flanges 122, 132 is a V-spring. As previously discussed, the first annular spring 140 can instead embody different spring types, such as a canted coil spring or a ribbon spring. The backing ring 106 and the sealing component 104 are engaged to one another by mechanical inter-engagement 196, similar to that shown in FIG. 2, and by a spring in a groove arrangement. As shown, a canted coil spring 130 is positioned within a spring groove 136 formed in the backup or backing ring 106, shown as a groove with a tapered-bottom located between two sidewalls. Part of the spring 130 extends out of the spring groove 136 is captured by a mating groove 166 formed with the sealing component 104. The mating groove 166 has two generally parallel sidewalls and a flat bottom wall located therebetween. The engagement between the two grooves 136, 166 and the spring 130 limits radial movement of the sealing component 104 relative to the backing ring 106 and relative to the lengthwise axis of the seal assembly through the bore of the seal assembly. In another example, the spring groove 136 may be located in the sealing component 104 to hold the canted coil spring 130 and the mating groove 166 located in the backup ring 106 for receiving the part of the spring 130 that extends outside the spring groove 136. In other words, the location of the two groove geometries can reverse on the backup ring 106 and the sealing component 104.

The engagement of the components of the seal assembly to each other, or to the seal cavity in the housing, using annular springs may facilitate assembly of the seal assembly into the seal cavity of the housing when the housing is in a hard to reach location or in an awkward position. For example, the disclosed engagement between the seal assembly components leaves fewer loose components to be retained in the seal cavity of the housing. Also, the components of the seal assembly will not come apart during transport or under other physically disruptive environment. Furthermore, the engagement of the components of the seal assembly can strengthen retention of the seal assembly in the seal cavity from gravity and vibration, especially if the seal assembly is exposed to a vibratory environment or other conditions that can tend to cause separation and/or looseness.

FIG. 5 also shows two additional grooves 200, 202 formed with the backing ring 106. One of grooves is a spring groove 200 comprising a tapered bottom located between two sidewalls having a third spring 152, shown as a canted coil spring, located therein. The third annular spring 152 has a portion that extends outside the spring groove 200 and received by a mating groove 166 formed in the second stationary component 194. The function of the third annular spring 152 within the second spring groove 200 closely resembles that of the previous figures wherein the use of the annular spring reduces the installation force and centers the seal assembly better than embodiments without the same spring and groove arrangement.

To further strengthen the retention of the seal assembly 190 within the seal cavity, FIG. 5 shows an annular member 210, shown as an O-ring, within a groove 202, such as an additional groove, in the backup ring 106, shown as a tapered-bottom located between two generally parallel sidewalls. The annular member 210 within the groove 202 engages a mating groove 166, such as another groove, formed in the housing or second stationary component 194. As mentioned for other embodiments discussed elsewhere herein, the number of annular springs, annular members, and grooves are not limited to that shown in FIG. 5 and may include more or fewer than as shown.

Methods of making and using the seal assemblies described herein are contemplated.

Although limited embodiments of seal assemblies and their components have been specifically described and illustrated herein, many modifications and variations will be apparent to those skilled in the art. Furthermore, elements and features expressly discussed for one embodiment but not for another may equally apply provided the functionality or structures do not conflict. Thus, unless the context indicates otherwise, like features for one embodiment are applicable to another embodiment. Accordingly, it is to be understood that the seal assemblies and their components constructed according to principles of the disclosed devices, systems, and methods may be embodied other than as specifically described herein. The disclosure is also defined in the following claims.

What is claimed is:

1. A seal assembly for sealing two adjacent surfaces, comprising:
    a sealing component and a locking ring;
    wherein the sealing component has a seal lip for sealing a surface of a shaft;
    wherein the locking ring is engaged to the sealing component and together the locking ring and the sealing component define a spring cavity;
    wherein a first annular spring is positioned within said spring cavity to energize the seal lip of the sealing component;
    wherein the locking ring comprises a groove adjacent an outer radial section;
    wherein a second annular spring is positioned within or adjacent the groove of the locking ring; and
    wherein the second annular spring is located in and biases against a mating spring groove of a housing, the mating spring groove being smaller in overall width than an overall width of the seal assembly.

2. The seal assembly of claim 1, wherein the second annular spring engages the housing to retain the seal assembly within the housing.

3. The seal assembly of claim 1, wherein the groove of the locking ring comprises a bottom wall located between two sidewalls.

4. The seal assembly of claim 1, wherein the first annular spring is a canted coil spring.

5. The seal assembly of claim 1, wherein the second annular spring is a canted coil spring.

6. The seal assembly of claim 1, wherein part of the second annular spring extends outside of the groove of the locking ring and extends into the mating spring groove of the housing.

7. The seal assembly of claim 1, wherein the second annular spring is filled with an elastomer.

8. The seal assembly of claim 3, wherein the bottom wall is tapered relative to the two sidewalls or comprises a V-shaped surface.

9. The seal assembly of claim 1, wherein the locking ring is made from a first material and wherein the second annular spring is made from a second material, which is different from the first material.

10. The seal assembly of claim 1, wherein a middle portion of the first annular spring contacts a distal region of the seal lip of the sealing component.

11. The seal assembly of claim 1, wherein the groove of the locking ring comprises a bottom wall located between two sidewalls, the bottom wall having a flat portion substantially perpendicular to one of the two sidewalls at a first end and an inclined portion relative to the flat portion at a second end.

12. The seal assembly of claim 11,
    wherein the second annular spring biases against the mating spring groove having a V-shaped surface.

13. The seal assembly of claim 1,
    wherein the groove of the locking ring comprises a V-shaped surface; and
    wherein the second annular spring biases against the mating spring groove having a bottom wall located between two sidewalls, the bottom wall having a flat portion substantially perpendicular to one of the two sidewall at a first end and an inclined portion relative to the flat portion at a second end.

14. The seal assembly of claim 1,
    wherein the groove of the locking ring comprises a V-shaped surface; and
    wherein the second annular spring biases against a V-shaped surface of the mating spring groove of the housing.

15. The seal assembly of claim 11,
    wherein the second annular spring biases against a bottom wall located between two sidewalls of the mating spring groove of the housing, the bottom wall being substantially perpendicular to at least one of the two sidewalls.

16. The seal assembly of claim 1,
wherein the groove of the locking ring comprises a bottom wall located between two sidewalls, the bottom wall being substantially perpendicular to at least one of the two sidewalls; and
wherein the second annular spring biases against a bottom wall located between two sidewalls of the mating spring groove of the housing, the bottom wall having a flat portion substantially perpendicular to one of the two sidewalls at a first end and an inclined portion relative to the flat portion at a second end.

17. A seal assembly for sealing two adjacent surfaces, comprising:
a sealing component, a backup ring, and a locking ring;
wherein the sealing component has a seal lip for sealing a surface of a shaft;
wherein the sealing component is engaged to the backup ring;
wherein the locking ring is engaged to the sealing component and together the locking ring and the sealing component define a spring cavity;
wherein a first annular spring is positioned within said spring cavity to energize the seal lip of the sealing component;
wherein the backup ring contacts a side of the sealing component opposite the spring cavity;
wherein the backup ring comprises at least one spring groove along an outside diameter of the backup ring;
wherein a second annular spring is positioned within the at least one spring groove of the backup ring and biases against a housing;
wherein the locking ring comprises a spring groove along an outside diameter of the locking ring;
wherein a third annular spring is positioned within the spring groove of the locking ring and biases against the housing; and
wherein at least a portion of the third annular spring extends into a mating spring groove of the housing, the mating spring groove being smaller in overall width than an overall width of the seal assembly.

18. The seal assembly of claim 17, wherein the second annular spring is a canted coil spring.

19. The seal assembly of claim 17, wherein the locking ring is without an axially extending cantilever leaf spring for radially biasing against the housing.

20. The seal assembly of claim 17, wherein said third annular spring is a canted coil spring.

21. The seal assembly of claim 17, wherein the at least one spring groove of the backup ring has a bottom located between two sidewalls.

22. The seal assembly of claim 20, wherein the groove of the locking ring comprises a tapered bottom located between two sidewalls.

23. The seal assembly of claim 17, wherein the sealing component comprises a protrusion, the backup ring comprises a recess; and the protrusion engages the recess to form a form a mechanical inter-engagement.

\* \* \* \* \*

UNITED STATES PATENT AND TRADEMARK OFFICE
CERTIFICATE OF CORRECTION

PATENT NO. : 10,184,564 B2
APPLICATION NO. : 15/011207
DATED : January 22, 2019
INVENTOR(S) : Peter J. Balsells et al.

It is certified that error appears in the above-identified patent and that said Letters Patent is hereby corrected as shown below:

In the Specification

In Column 7, Line 33, delete "FIG." and insert -- FIGS. --, therefor.

In Column 7, Line 36, delete "FIG." and insert -- FIGS. --, therefor.

In the Claims

In Column 16, Lines 27-28, in Claim 23, delete "form a form a" and insert -- form a --, therefor.

Signed and Sealed this
Twenty-seventh Day of August, 2019

Andrei Iancu
*Director of the United States Patent and Trademark Office*